March 3, 1959
B. H. DAVIS
2,875,469
AUTOMATIC STOCK FEED INTO EXTRUSION APPARATUS
Filed Feb. 1, 1957
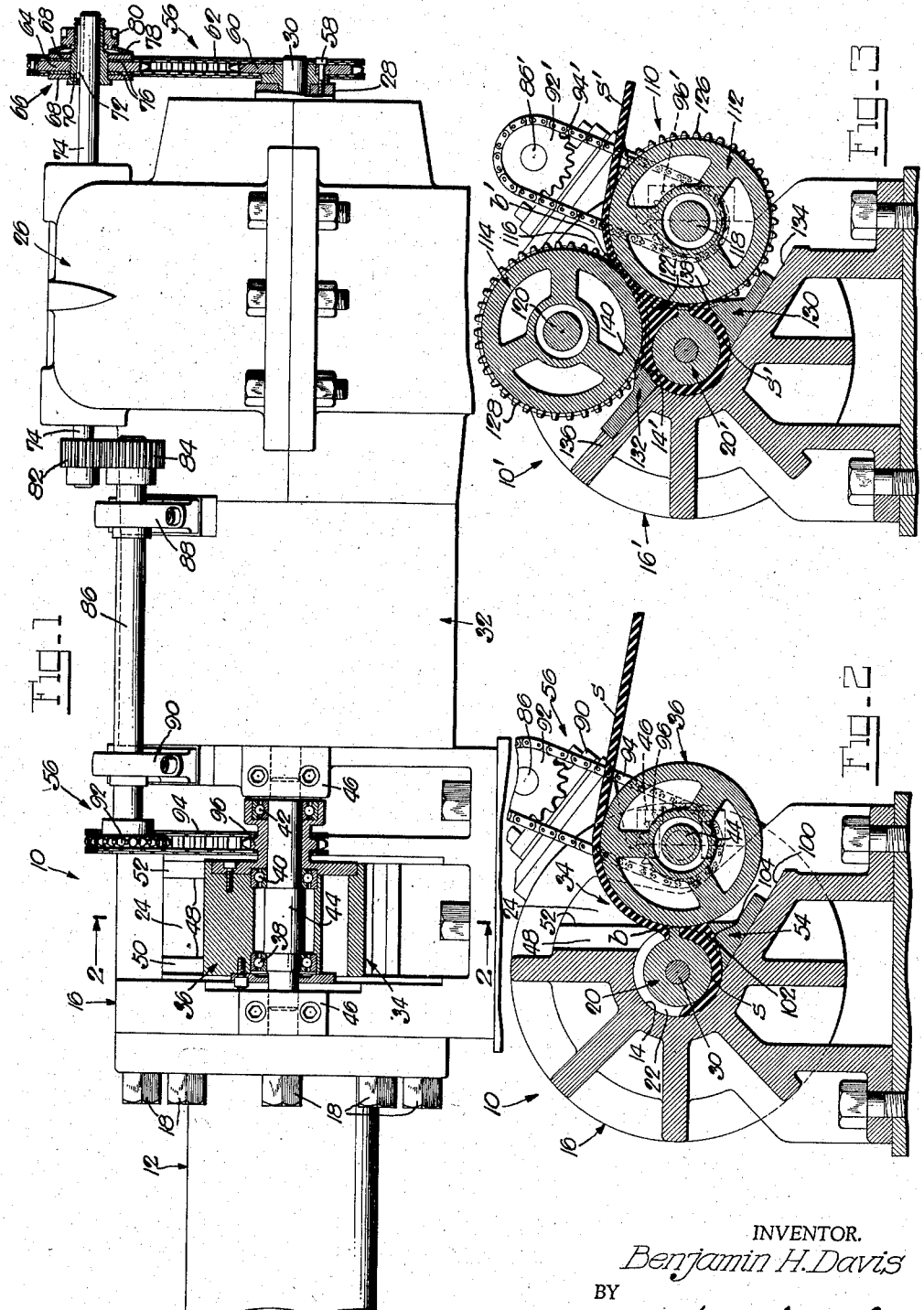
INVENTOR.
Benjamin H. Davis
BY
Attorney.

United States Patent Office 2,875,469
Patented Mar. 3, 1959

2,875,469

AUTOMATIC STOCK FEED INTO EXTRUSION APPARATUS

Benjamin H. Davis, Noank, Conn., assignor to Standard Machinery Division of Franklin Research Corporation, Mystic, Conn., a corporation of Delaware Application February 1, 1957, Serial No. 637,664

11 Claims. (Cl. 18—2)

This invention relates to extrusion apparatus in general, and to stock feed controls therefor in particular.

The present invention is concerned with the automatic feed into extrusion apparatus of rubber or rubber-like plastics especially, though not exclusively, in ribbon form, hereinafter referred to as "stock." Stock of this kind is customarily fed through the throat of a hopper into one end of an extrusion cylinder wherein the usual feed screw works the stock while forcing the same ahead in the cylinder toward and through an extrusion die in a head at the other end thereof. Customarily, this stock in continuous ribbon form is wound on a turnable pallet in the vicinity of the hopper, and is withdrawn therefrom into and through the throat in the hopper at a rate commensurate with the stock take-in capacity of the power-driven feed screw. To this end, different stock-feeding expediencies have heretofore been resorted to in attempting to keep the feed screw continuously supplied with stock from the wound supply on the pallet. However, to the best of my knowledge, these prior stock feeding expediencies, while satisfactory in some respects, have failed in other important respects. Thus, one of these prior stock feeding expediencies was in the nature of a power-driven roll in the throat in the hopper in such close proximity to the feed screw thereat as to cooperate with the latter in gripping the stock and drawing it into the throat. However, this roll-type stock feed had the great disadvantage that it would soon overfeed stock into the feed screw and, in consequence, jam stock in the wedge-like space in the throat between the diverging peripheries of the roll and feed screw with such tremendous force that usually the roll shaft, as the weakest element subjected thereto, would actually be bent and soon break unless the feed action of the roll was constantly supervised. Also, this roll-type stock feed gave rise to all too frequent tearing apart of the stock ribbon and, hence, interruption of the stock feed to the screw, especially in the case of the more fragile and readily tearable rubbers, such as butyl rubber, for example. Thus, despite even close supervision of the stock feed, there would occur more or less prolonged stoppages of the infeed of the stock along the periphery of the roll until excess stock pressures in the immediate vicinity of the feed screw due to uncontrollable excess stock thereat had been relieved and the excess stock taken in by the feed screw, followed by sudden resumption of the infeed of the stock along the periphery of the roll and ensuing jerks on the stock ribbon which frequently caused it to tear apart. It thus follows that this prior roll-type feed was utterly useless for the automatic and continuous feed of ribbon-type stock into the feed screw without an attendant's constant supervision of and frequent intervention in the stock feed.

It is the primary aim and object of the present invention to provide a roll-type stock feed which will assuredly deliver to the feed screw in an extrusion cylinder through the throat therein a constant optimum stock supply from a continuous stock ribbon of any length until the same is used up, without requiring an attendant's supervision of or intervention in the stock feed at any time.

Thus, it is among the objects of the present invention to provide a power-operated roll-type stock feed which will deliver to the feed screw in the extrusion cylinder through the throat therein a constant stock supply which at no time exceeds a permissible safe pressure at which the continuous stock ribbon from which the power feed draws is kept at substantially continuous, and at the most only gradually varying, infeed motion by the latter, thereby to avoid not only excessive, and especially bursting, back pressures of the stock against the power feed, but also any jerks on the stock ribbon that could tear the same apart.

It is another object of the present invention to provide a power-operated roll-type stock feed which will deliver to the feed screw in the extrusion cylinder through the throat therein a constant stock supply which at all times remains substantially at the aforementioned permissible safe pressure, so that the continuous stock ribbon from which the power feed draws is kept by the latter at an infeed motion which varies only inappreciably, so that the stock ribbon is to all intents and purposes subjected to no jerks.

It is a further object of the present invention to provide for the roll-type stock feed a drive of a set torque which cannot be exceeded and at which the stock supply constantly delivered to the feed screw does not exceed at any time the aforementioned permissible safe pressure.

Another object of the present invention is to provide for the roll-type stock feed a drive which originates from a prime mover of greater torque output than is required for the feed operation, and has sufficient speed to operate the stock feed at least at the speed required for keeping the stock ribbon in substantially continuous infeed motion at the required rate, and to interpose in the drive a simple friction clutch which will slip when the torque transmitted through the driven member thereof exceeds the aforementioned set torque, thereby to achieve not only the delivery to the feed screw of a constant stock supply which at all times remains substantially at the aforementioned permissible safe pressure, but also only inappreciable variation of the infeed motion of the stock ribbon at which the same is kept by the roll-type feed.

A further object of the present invention is to provide the aforementioned drive of the roll-type stock feed with a friction clutch of adjustable torque output, thereby to achieve optimum uniformity of the infeed of the stock ribbon by the feed for any given extruder installation, as well as ready adaptation of the present roll-type stock feed to extruders of different capacity and/or performance and for different kinds of rubber.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary side view, partly in section, of an extruder installation embodying the present invention;

Fig. 2 is a cross section through the same extruder installation as taken on the line 2—2 of Fig. 1; and Fig. 3 is a cross section through an extruder installation embodying the present invention in a modified manner.

Referring to the drawings, and more particularly to Figs. 1 and 2 thereof, the reference numeral 10 designates extrusion apparatus having the customary extrusion cylinder 12 with an internal bore 14 which at the rear end of the cylinder is continued in a presently separate hopper 16 to which the former is secured, presently by bolts 18. Turnable in the cylinder bore 14 is the usual feed screw 20 having one or more spiral flights or ribs 22, presently one, for forcing stock s in the cylinder toward the forward or discharge end thereof and ultimately into an extrusion head thereat and through an extrusion die therein (neither shown). The stock is admitted to the feed screw 20 in the cylinder bore 14 through a throat 24 in the hopper 16.

The feed screw is customarily driven, presently in clockwise direction as viewed in Fig. 2, by a worm and worm gear (not shown) in a case 26 of which the worm is operatively connected with any suitable prime mover, such as an electric motor, for instance, while the worm gear is carried by a hollow shaft 28 (Fig. 1) which is suitably journalled in the gear case 26 and keyed to or otherwise drivingly connected with a throughshaft 30 that extends through the feed screw 20 and is keyed to or otherwise drivingly connected with the latter. Interposed between the hopper 16 and gear case 26 is the usual thrust housing 32 which contains conventional bearings for taking up the considerable back thrust of the feed screw 20 when the same is in operation.

The instant extrustion apparatus 10 is adapted to receive especially, though not exclusively, stock in continuous ribbon form, and more particularly natural or synthetic rubber stock, including the more fragile and readily tearable rubbers, such as butyl rubber, for example. In accordance with the present invention, there is provided a roll-type power feed 34 for continuous automatic delivery of the ribbon-type supply stock s to the feed screw. This power feed 34, which presently includes the feed screw 20 as will appear obvious hereinafter, also comprises a feed roll 36 which, in the present instance, is made of several parts, as shown, and is journalled, presently through intermediation of antifriction bearings 38, 40 and 42, on a shaft 44 which is mounted with its ends in suitable bearing provisions 46 on the hopper 16. This feed roll 36 extends within and throughout the longitudinal confines or extent of the throat 24 (Fig. 1), and further extends with its periphery into close proximity to the feed screw 20 (Fig. 2). The throat proper is preferably narrowed at 48 by offset ledge formations 50 and 52 in the hopper which tangentially approach the periphery of the feed roll 36 (Fig. 2) and preferably continue in close proximity to the same at least to a scraper block 54, so that the stock s in the throat proper is prevented from escaping therefrom along the feed roll.

The feed 34 also comprises a power drive 56 for the feed roll 36, which significantly and in accordance with an important aspect of the present invention features a slip-type clutch. This power drive 56 originates, in the present instance, at the worm gear drive of the feed screw 20. To this end, there is bolted at 58 to the worm gear shaft 28 a sprocket 60 which through a chain 62 is drivingly connected with a sprocket 64 that presently forms the driving element of a slip-type clutch 66, in this instance a friction clutch, the driven element 68 of which is presently formed by two discs that are splined to a sleeve 70 which is keyed at 72 to a shaft 74, suitably journalled in the gear case 26. The driven clutch discs 68 preferably have suitable friction linings 76. The driving clutch element 64, which is interposed between the driven clutch discs 68, is turnable and axially slidable on the sleeve 70. The driving clutch element 64 is urged into driving engagement with the friction lined clutch discs 68 by suitable spring means, presently a spring washer 78 which is held resiliently deflected by a nut 80 on the adjacent threaded end of the sleeve 70.

The shaft 74 carries at its other end a gear 82 which is in permanent mesh with another gear 84 on a countershaft 86, journalled in suitable bearing brackets 88 and 90 on the thrust housing 32 and hopper 16, respectively. The countershaft 86 also carries a sprocket 92 which through a chain 94 is drivingly connected with a sprocket 96 that turns with the feed roll 36. Of course, the drive of the feed roll 36 is such hat the same turns counter to the feed screw 20, i. e., the feed roll is driven counterclockwise as viewed in Fig. 2.

In the present instance, the throat in the hopper 16 extends beneath the bite b of the feed roll 36 and feed screw 20 and is closed at the lowermost end by the hereinbefore mentioned scraper block 54 which is suitably mounted on an inclined ledge formation 100 on the hopper 16. Significantly, the scraper block 54 and the adjacent diverging peripheries of the feed roll 36 and feed screw 20 from their bite b downwardly define within and throughout the longitudinal confines or extent of the throat proper a wedge-like space 102 which is open to the cylinder bore 14. Advantageously, the inner surface 104 of the scraper block 54, which defines part of the wedge-like space 102, gradually approaches the cylinder bore 14 in the clockwise drive direction of the feed screw 20 (Fig. 2) and merges substantially tangentially with the cylinder bore 14. Also, the inner scraper block surface 104, which in this instance is curved, extends into close proximity to the periphery of the feed roll 36 and forms therewith within the confines of the wedge-like space 102 an obtuse angle, so that this inner block surface 104 serves as a scraper on the feed roll to prevent the outward escape thereat of any substantial stock s from the space 102.

The continuous ribbon-type supply stock s may for its ready pay-out into the throat of the extrusion cylinder by the power feed 34 be stored in any suitable manner best suited for the occasion. Thus, it is a commonly adopted practice to wind the continuous ribbon-type supply stock on a relatively freely turnable pallet (not shown) which offers little resistance to the unwinding of the stock therefrom so that the ensuing tension in the stock will never tear the same apart regardless of the kind of stock. The leading end of the ribbon-type supply stock s is then introduced into the bite b of the feed roll 36 and feed screw 20 while the latter are driven or their drive is started. The space 102 will quickly be filled with stock s under the combined friction-feed action of the driven feed roll 36 and feed screw 20 and also by the more positive stock infeed action of the spiral flight 22 of the feed screw as it sweeps through or past the space 102. Once this space 102 is filled with stock s, it will remain filled by constantly added new stock which replaces the other stock therein as it is taken in by the feed screw, and the stock in the space 102 is, by virtue of the wedge-like shape of the latter, also put under some pressure by the diverging peripheries of the driven feed roll and feed screw within this space 102, as will be readily understood. This stock pressure in the space 102 is ideally suited to keep the feed screw filled with stock substantially completely and constantly throughout an extrusion operation. However, in order to prevent excessive and even bursting stock pressures in the wedge-like space 102 against the feed roll 36, the friction clutch 66 will be so set as to permit slippage of the driving element 64 relative to the driven discs 68 thereof long before such excessive stock pressures in the space 102 could develop.

Since friction on the part of the feed roll 36 for its share of the infeed of the stock into the space 102 is relied upon, the explained drive of the feed roll 36 is preferably such that the peripheral speed of the latter is somewhat in excess of that of the feed screw 20. Furthermore, in order to obtain an adequate friction drive of the continuous ribbon-type stock from the periphery of the feed roll 36, the latter is made of adequate diameter, and preferably of a diameter larger than that of the feed screw 20, though not so large that its periphery within the space 102 would reduce the wedge angle of the latter, pointing toward the bite *b* of the feed roll and feed screw, to such an extent as to reduce pressure generation in the stock *s* within this space 102 to such a low value that fairly complete and constant filling of the feed screw with stock would no longer be achieved.

The friction clutch 66 is preferably so adjusted that the driving element 64 will slip on the driven discs 68 before the pressure of the stock *s* in the wedge-like space may increase to a magnitude at which to compel even occasional short stoppage of the infeed of the continuous ribbon-type stock into the space 102 followed by more or less jerky resumption of the stock infeed which might tear the stock ribbon apart and thus interrupt the automatic stock infeed into the extrusion apparatus. Thus, it is quite easy to adjust the friction clutch 66 so that the output torque therefrom will keep the continuous stock ribbon in substantially constant motion over the feed roll 36 and into the space 102 with the stock ribbon undergoing only creeping variations in its speed so that the ensuing stresses in the stock ribbon are far too small to tear it apart, even if the stock is of any of the more fragile and readily tearable rubbers. Of course, the adjustability of the friction clutch 66 is further advantageous in that it permits ready adaptation of the present stock feed 34 to extruders of different capacity and/or performance, and for different kinds of rubber.

While in the described extrusion apparatus the drive of the feed roll 36 advantageously originates at the power drive of the feed screw 20, the feed roll 36 would, of course, perform with equal advantage if its drive would not originate at the power drive of the feed screw and, instead, originate at a separate prime mover of a torque output in excess of that required by the feed roll.

Reference is now had to Fig. 3 which shows extrusion apparatus 10' with a modified roll-type power feed 110 which, contrary to the described feed 34, does not include the feed screw 20'. Thus, the present feed 110 comprises two companion rolls 112 and 114 which project into a throat 116 and are suitably journalled on shafts 118 and 120, respectively, which may be mounted with their ends in suitable bearing provisions on the hopper 16'. The companion rolls 112 and 114, which have a bite *b'* of approximately the thickness of the continuous ribbon-type stock *s'*, form with their diverging peripheries from their bite *b'* downwardly and within and throughout the longitudinal extent of the throat 116 a wedge-like space 122 which is open to the cylinder bore 14'. The power drive of the feed roll 112 may be the same as that described for the feed roll 36 in Figs. 1 and 2, to the inclusion of an adjustable friction clutch and shaft 86', sprocket 92', chain 94' and sprocket 96' which turns with the feed roll 112. Also, the present drive of the feed roll 112 may originate at the power drive of the feed screw 20' or at a separate prime mover of greater torque output than that required by the feed roll 112. The other feed roll 114 may be an idler, but is preferably driven from its companion roll 112, presently through gears 126 and 128, for the required drive of the roll 114 in a direction, presently clockwise, which is opposite to the counterclockwise drive of the roll 112. Continuing the wedge-like space 122 in the throat 116 to the cylinder bore 14' are scraper blocks 130 and 132 which are suitably mounted on inclined ledge formations 134 and 136, respectively, on the hopper 16', and extend with their scraper edges 138 and 140 into close proximity to the peripheries of the feed rolls 112 and 114, respectively.

The instant modified stock feed 110, while perhaps not preferred over the other stock feed 34 (Figs. 1 and 2) because of the greater number of parts required and for other reasons, nevertheless performs on the same principle as the stock feed 34 and secures the same advantages.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In extrusion apparatus, the combination with an extrusion cylinder for the reception of a rotary feed screw and having at one end a throat for the admission of ribbon-like stock into the interior of the cylinder, of companion stock feed rolls turnable about axes substantially parallel to the cylinder axis and forming with their diverging peripheries in said throat a wedge-like passage open at its widest inner end to the interior of said cylinder; and means for so yieldingly driving at least one of said rolls that the latter will stop at a preset torque.

2. In extrusion apparatus, the combination with an extrusion cylinder for the reception of a rotary feed screw and having at one end a throat for the admission of ribbon-like stock into the interior of the cylinder, of companion stock feed rolls turnable about axes substantially parallel to the cylinder axis and forming with their diverging peripheries in said throat a wedge-like passage open at its widest inner end to the interior of said cylinder; and driving means for one of said rolls, including a prime mover and a slip-type clutch between the latter and said one roll set to slip at a predetermined torque.

3. The combination in extrusion apparatus as set forth in claim 2, in which the other of said rolls is a power-driven feed screw in said cylinder, and said one roll is driven at a peripheral speed in excess of that of said feed screw.

4. The combination in extrusion apparatus as set forth in claim 2, in which both of said rolls are with their peripheries outside the interior confines of said cylinder.

5. The combination in extrusion apparatus as set forth in claim 2, in which both of said rolls extend with their peripheries to, but not within, the interior confines of said cylinder.

6. The combination in extrusion apparatus as set forth in claim 2, in which both of said rolls are with their peripheries outside the interior confines of said cylinder, and there is further provided a positive driving connection between said rolls so that they will turn in opposite directions, respectively.

7. The combination in extrusion apparatus as set forth in claim 2, further comprising a feed screw in said cylinder, and a power drive for said feed screw, said power drive also constituting said prime mover, and said driving means driving said one roll at a peripheral speed in excess of that of said feed screw.

8. The combination in extrusion apparatus as set forth in claim 2, further comprising a feed screw in said cylinder, a positive driving connection between said rolls so that they will turn in opposite directions, respectively, and a power drive for said feed screw, said power drive also constituting said prime mover, and said driving means driving said one roll at a peripheral speed in excess of that of said feed screw.

9. The combination in extrusion apparatus as set forth in claim 2, in which said clutch is adjustable so as to slip at different torques.

10. In extrusion apparatus, the combination with an extrusion cylinder having a longitudinal bore, a feed screw turnable in said bore in one direction for the feed of stock to one end of said cylinder, with the latter also having at its other end a throat with a surface thereof gradually approaching said bore in said one direction and merging therewith substantially tangentially for the admission of ribbon-like stock to said feed screw, and a power drive for said screw, of a roll turnable about an axis substantially parallel to the cylinder axis and with its periphery extending into close proximity to said feed screw and forming with the latter and said throat surface within and throughout the longitudinal confines of said throat a wedge-like space open to said bore; and means for driving said roll in a direction opposite to said one direction and at a peripheral speed in excess of that of said feed screw, said driving means including a prime mover and a friction clutch between the latter and said roll set to slip at a predetermined torque.

11. The combination in extrusion apparatus as set forth in claim 10, in which said throat surface substantially extends to said roll periphery and forms with the latter an obtuse angle within said space, so that said throat surface serves as a scraper on said roll.

References Cited in the file of this patent

UNITED STATES PATENTS

| | | |
|---|---|---|
| 1,422,561 | Gomersall | July 11, 1922 |
| 1,809,983 | Lodge | June 16, 1931 |
| 2,579,747 | Martin | Dec. 25, 1951 |
| 2,627,087 | Hendry | Feb. 3, 1953 |
| 2,695,702 | Ellen | Nov. 30, 1954 |
| 2,747,224 | Koch et al. | May 29, 1956 |

FOREIGN PATENTS

| | | |
|---|---|---|
| 326,744 | Italy | June 15, 1935 |
| 695,810 | France | Oct. 6, 1930 |